(12) United States Patent
Iwasaki

(10) Patent No.: US 7,085,311 B2
(45) Date of Patent: Aug. 1, 2006

(54) APPARATUS AND METHOD FOR MEASURING SIR IN CDMA COMMUNICATION SYSTEM

(75) Inventor: Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 779 days.

(21) Appl. No.: 10/199,013

(22) Filed: Jul. 22, 2002

(65) Prior Publication Data

US 2003/0021336 A1 Jan. 30, 2003

(30) Foreign Application Priority Data

Jul. 24, 2001 (JP) ............................ 2001-223349

(51) Int. Cl.
*H04B 1/707* (2006.01)

(52) U.S. Cl. .................. 375/147; 375/130; 375/316

(58) Field of Classification Search ............... 375/130, 375/136–137, 140–144, 147–150, 152, 316; 370/335, 342, 441
See application file for complete search history.

(56) References Cited

U.S. PATENT DOCUMENTS

| | | | | |
|---|---|---|---|---|
| 6,115,591 | A * | 9/2000 | Hwang | 455/277.2 |
| 6,341,224 | B1 * | 1/2002 | Dohi et al. | 455/522 |
| 6,801,566 | B1 * | 10/2004 | Ha | 375/148 |
| 2001/0014114 | A1 * | 8/2001 | Baltersee et al. | 375/148 |

FOREIGN PATENT DOCUMENTS

| | | |
|---|---|---|
| EP | 0 978 950 A2 | 2/2000 |
| EP | 0 982 871 A2 | 3/2000 |
| JP | H10-135904 | 5/1998 |
| JP | H10-190497 | 7/1998 |
| JP | H10-336072 | 12/1998 |
| JP | 2870526 B1 | 1/1999 |
| JP | 2000-49662 A | 2/2000 |
| JP | 2000-68981 A | 3/2000 |
| JP | 2000-196522 A | 7/2000 |
| JP | 2000-236296 | 8/2000 |
| JP | 2000-252894 A | 9/2000 |
| JP | 2001-036480 | 2/2001 |
| JP | 2001-244859 | 9/2001 |
| JP | 2002-330102 | 11/2002 |
| JP | 2003-008548 | 1/2003 |

* cited by examiner

*Primary Examiner*—Kevin Burd
*Assistant Examiner*—Freshteh Aghdam
(74) *Attorney, Agent, or Firm*—Sughrue Mion, PLLC

(57) ABSTRACT

The present invention includes path delay difference comparator 14 for receiving path delay amounts $\tau_1$ to $\tau_K$ detected from a reception signal and extracting each pair of paths satisfying first condition ($|\tau_i-\tau j|\leq\tau th$), de-spreaders 11$_1$ to 11$_K$ for performing de-spreading according to the path delay amounts, estimator 12$_1$ to 12$_K$ for estimating an SIR value every path, estimators 13$_1$ to 13$_K$ for estimating the carrier phase every path, phase difference comparator 15 for comparing the carrier phases $\theta 1$ to $\theta k$ of the paths of each pair satisfying the first condition and extracting each pair of paths satisfying second condition ($|\theta_1-\theta j|\leq\theta th$), and comparator 16 for selecting one path having larger SIR from the paths of each pair extracted and using the SIR value of the selected path for SIR combining.

7 Claims, 6 Drawing Sheets

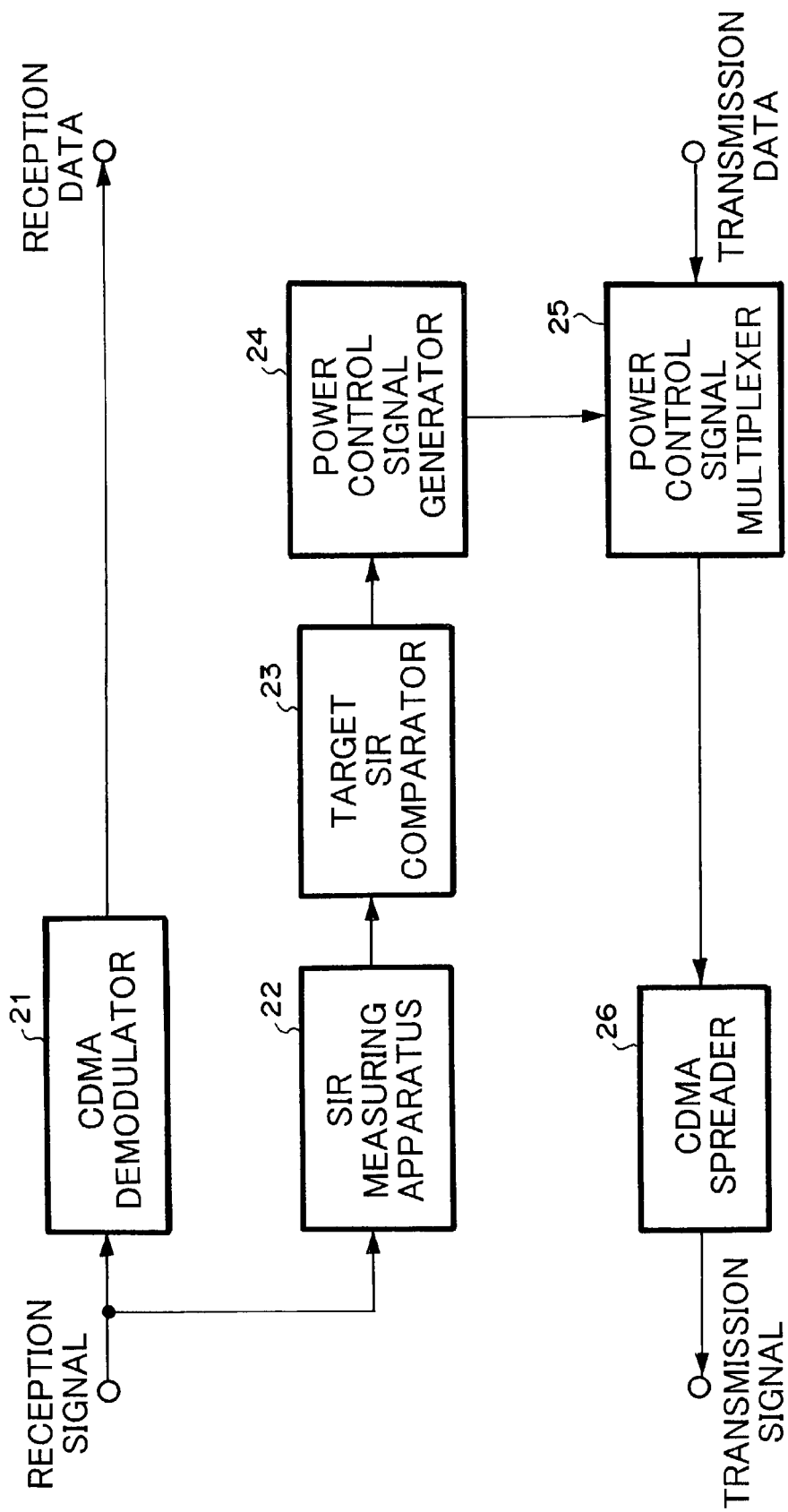

APPARATUS AND METHOD FOR MEASURING SIR IN CDMA COMMUNICATION SYSTEM

BACKGROUND OF THE INVENTION

1. Field of the Invention

The present invention relates to a CDMA communication technique and particularly, to a SIR (Signal to Interference Ratio) measuring apparatus and a SIR measuring method.

2. Description of the Related Art

In spectrum-spreading radio communications using CDMA (Code Division Multiple Access) communication system, at a transmission side, after a primary modulation is executed on data, a secondary modulation using spread codes (Pseudo Noise: PN) is executed to spread the signal band of the data and then the data thus spread are transmitted. In this case, the spread codes (pseudo noises) used for spreading are allocated while they are different among users or information channels, so that multiplexing is performed and the frequency band can be used on plural channels at the same time. At a reception side, a reception signal (data) in a broad band are subjected to de-spreading using spread codes (pseudo noises) so as to be returned to the original signal in a narrow band, and then demodulation processing is executed on the original signal thus returned.

In the de-spreading process described above, the correlation with the reception signal is executed by using the same spread codes as the spread codes (pseudo noises) used at the transmission side, and correlation detection at a desired channel is carried out by using a de-spreading filter, so that a signal desired by a user can be detected from the multiplexed reception signal.

Since cross-correlation generally exists among spreading codes, the cross-correlation is also outputted while it is contained in a de-spread output signal, and thus it generates an interference signal. If the number of users to be multiplexed increases, the number of interference signals (the magnitude of the interference signal) increases, resulting in degradation in reception characteristic. In the CDMA system for spreading signals to signals in a broader band by using higher-speed spreading codes than the period of information (symbols) and carrying out multiplexing access transmission, a pilot signal whose pattern has been known is periodically inserted between information signals to construct frames.

In a mobile communication system based on the CDMA system, transmission power is required to be optimally controlled on the basis of reception SIR (Signal to Interference Ratio) in order to reduce interference signals. In order to satisfy this requirement, it is important to estimate SIR of reception signals with high precision. SIR of a CDMA receiver is disclosed in Japanese Laid-open Patent Publication No. 2000-49662, and Japanese Laid-open Patent Publication No. 2000-68981.

Mobile communications are used under multi-path environments, and RAKE combining based on a path diversity system is generally used in the CDMA communications. As a CDMA receiver is used a RAKE receiver in which plural reception signals passing through different paths (transmission paths) are respectively subjected to de-spreading (a correlator for performing de-spreading is called as "RAKE finger") using the reception delay amounts corresponding to the respective paths, respectively and then RAKE combining is carried out.

In this case, it is required to estimate SIR after RAKE combining. As well known, according to the RAKE combining system, a reception signal is subjected to de-spreading on the basis of path delay information detected by a path detector (path search portion), then a de-spread signal of each path is phase-detected, and then they are weighted and added so that SIR after combining is maximum.

FIG. 1 is a diagram showing an example of the construction of a conventional SIR measuring apparatus for estimating SIR after RAKE combining. Referring to FIG. 1, path detector 10 to which reception signal 1 is inputted includes plural correlators for taking the correlation between the reception signal and each of spreading codes (pseudo noise signals) that are delayed by the respective different delay amounts within a path search range. Thereafter, delay profiles are created on the basis of the correlation output values from the plural correlators, and then the delay profiles are compared with a predetermined threshold value, so that path detection is performed and path delay amount signal is outputted to de-spreaders $11_1$ to $11_k$. The de-spreaders $11_1$ to $11_k$ take the correlation between the inputted reception signal 1 and the spreading code. In the de-spreaders $11_1$ to $11_k$, the spreading code from a spreading code generator is delayed on the basis of the path delay amount signal from the path detector 10.

SIR estimators $12_1$ to $12_K$ receive the outputs of the de-spreaders $11_1$ to $11_k$ to estimate SIR. That is, by using pilot symbols, for which a transmission sequence is known, of signals after synchronous detection, the data after the detection are subjected to inverse modulation based on the known transmission sequence, and then the average value of the power of the signal thus inversely-modulated is divided by the dispersion of the inversely-modulated signal to determine SIR. That is, the average of the symbols of the known inversely-modulated pilot signal is determined, and the power Ps of the signal is calculated from the square of the amplitude of the average value. On the basis of the inversely-modulated signal and the average value, the dispersion $P_I$ of the power is determined, and the SIR estimated value R is determined from the ratio $P_S/P_I$.

In combiner 18, representing the SIR value of each path by Ri, the total of the SIR value represented by the following equation (1) is outputted.

$$\sum_{i=1}^{K} Ri \quad (1)$$

That is, the total of the SIR output 2 after RAKE combining is given by the above equation (1) where the SIR value of each path is represented by Ri (i=1 to K).

In the SIR estimation described above, the SIR value Ri of each path is first estimated, and these SIR values are added with one another to implement the SIR estimation. The output of the combiner 18 shown in FIG. 1 is supplied to a transmission power controller or the like, and used to perform the transmission power control based on the value of SIR.

Under an actual transmission environment, there may be assumed such a situation that the delay amount of each path is extremely small. Therefore, the reception characteristic is enhanced by detecting path information at a narrow path interval less than 1 chip in the path detector.

Therefore, actually, there is such a case that even when there is only one path, plural path delay amounts are detected for the one path. That is, in the case where the path interval is set at a half chip, there is such a case that two path delays are detected for one chip.

In such a case, according to the conventional SIR estimation system described above, SIR for the same path is added twice when the difference of the delay amount of the path is small, and thus a larger value than actual SIR is estimated. That is, when the apparatus is designed so that path information is detected at a path interval less than one chip in order to enhance the reception characteristic, there may occur such a case that SIR for the same path is added at plural times, so that the measurement of SIR is inaccurate, and accurate power control cannot be performed.

SUMMARY OF THE INVENTION

The present invention has an object to provide a system, an apparatus and a method which can more accurately estimate reception SIR even when plural paths exist under multi-path environment and the difference in delay amount between the paths is small (the path delay amounts of the respective paths are close to each other) and even when the transmission environment is stationary and the number of paths is small.

In order to attain the above object, according to the present invention, with respect to each pair of paths between which the difference in path delay amount is small, the carrier phases thereof are compared with each other, and if the difference is not more than a predetermined threshold value, the paths are regarded as being the same path, and only the larger SIR is used for SIR calculation after RAKE combining.

According to a first aspect of the present invention, there is provided an SIR measuring apparatus comprising: a path detector for detecting path delay amounts of a reception signal inputted; plural de-spreaders for de-spreading the reception signal inputted on the basis of the path delay amounts detected by the path detector; plural SIR estimators that are provided in connection with the plural de-spreaders and estimate SIR (Signal to Interference Ratio) values every path; plural carrier phase estimators that are provided in connection with the plural de-spreaders and estimate carrier phase every path; a path delay difference comparator for detecting, from the paths detected by the path detector, each pair of paths satisfying the condition that the difference in the path delay amounts between the paired paths is not more than a first threshold value; a carrier phase difference comparator for receiving the path pairs outputted from the path delay difference comparator, comparing the carrier phase between the paths of each of the path pairs, and outputting each pair of paths satisfying the condition that the difference in carrier phases between the paired paths is not more than a second threshold value; an SIR comparator for receiving the SIR values outputted from the plural SIR estimators and the path pairs outputted from the carrier phase difference comparator, comparing the SIR values between the paths of each of the path pairs, outputting only each larger SIR value, and directly outputting the SIR values outputted from the SIR estimators with respect to paths other than the paired paths output from the carrier phase difference comparator; and an SIR combiner for summing the SIR values outputted from the SIR value comparator and outputting the total value.

According to another aspect of the present invention, there is provided an SIR measuring method comprising: a step of detecting path delay amounts from a reception signal; a step of extracting each pair of paths satisfying the condition that the difference in the path delay amounts is not more than a first threshold value; a step of de-spreading the reception signal on the basis of the path delay amounts; a step of estimating an SIR value every path on the basis of the de-spread signal; a step of estimating carrier phase every path on the basis of the de-spread signal; a step of extracting comparing the carrier phase between the paths of each pair satisfying the condition that the difference in the path delay amounts is not more than the first threshold value, and extracting, from the path pairs, pairs of paths satisfying that the difference in carrier phases is not more than a second threshold value; and a step of regarding as the same path the paths of each pair satisfying that the difference in the path delay amounts is not more than the first threshold value and the difference in carrier phases is not more than the second threshold value, selecting a larger SIR value from the SIR values of the paths of each pair and using the larger SIR values thus selected for calculation of SIR combining.

BRIEF DESCRIPTION OF THE DRAWINGS

FIG. 6 is a diagram showing a part of the construction of a mobile terminal or a base station of a mobile communication system of CDMA system.

DETAILED DESCRIPTION OF THE PREFERRED EMBODIMENTS

Preferred embodiments according to the present invention will be described hereunder with reference to the accompanying drawings.

Figure 1:
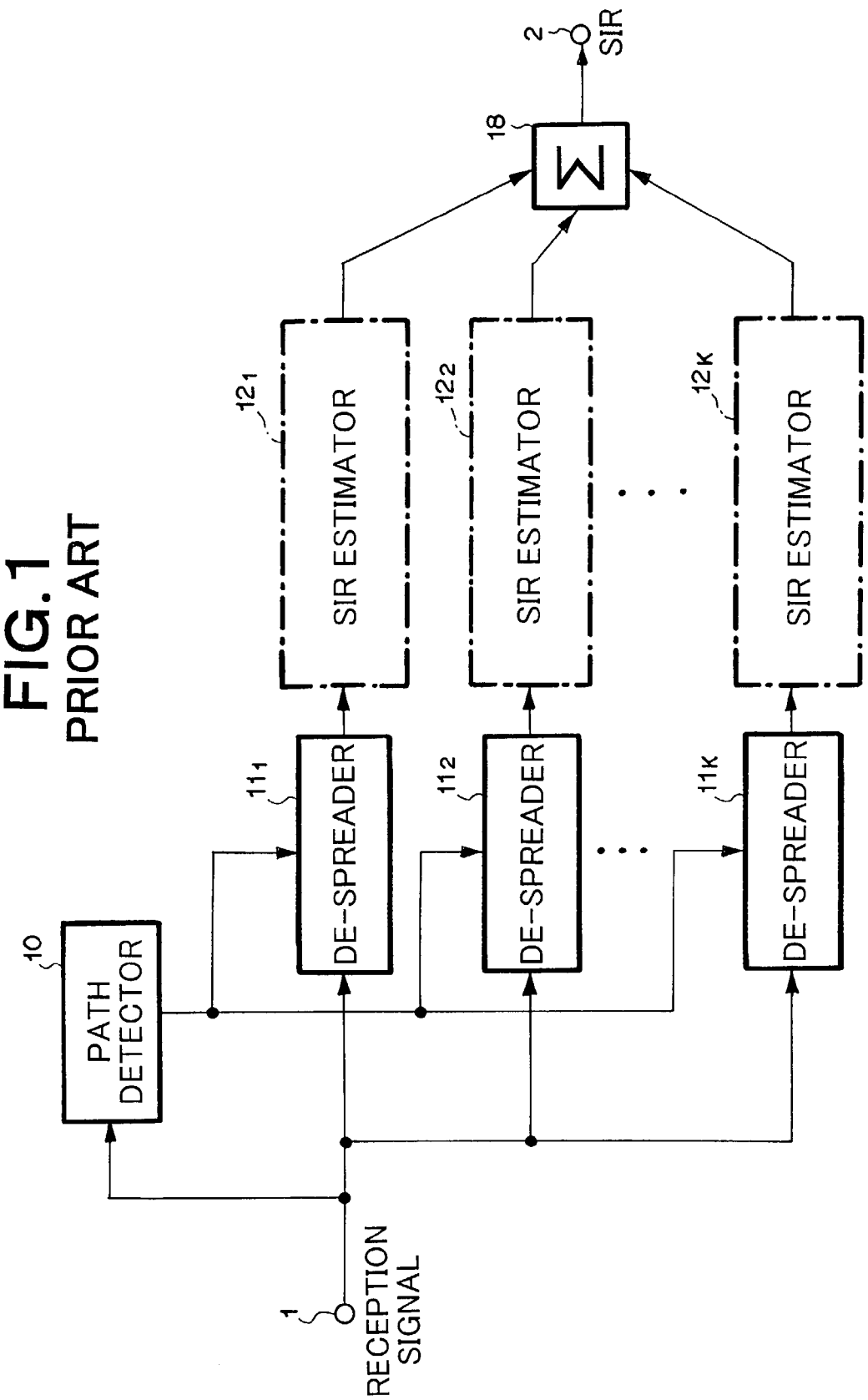
FIG. 1 is a diagram showing the construction of a conventional SIR measuring apparatus.
Figure 2:
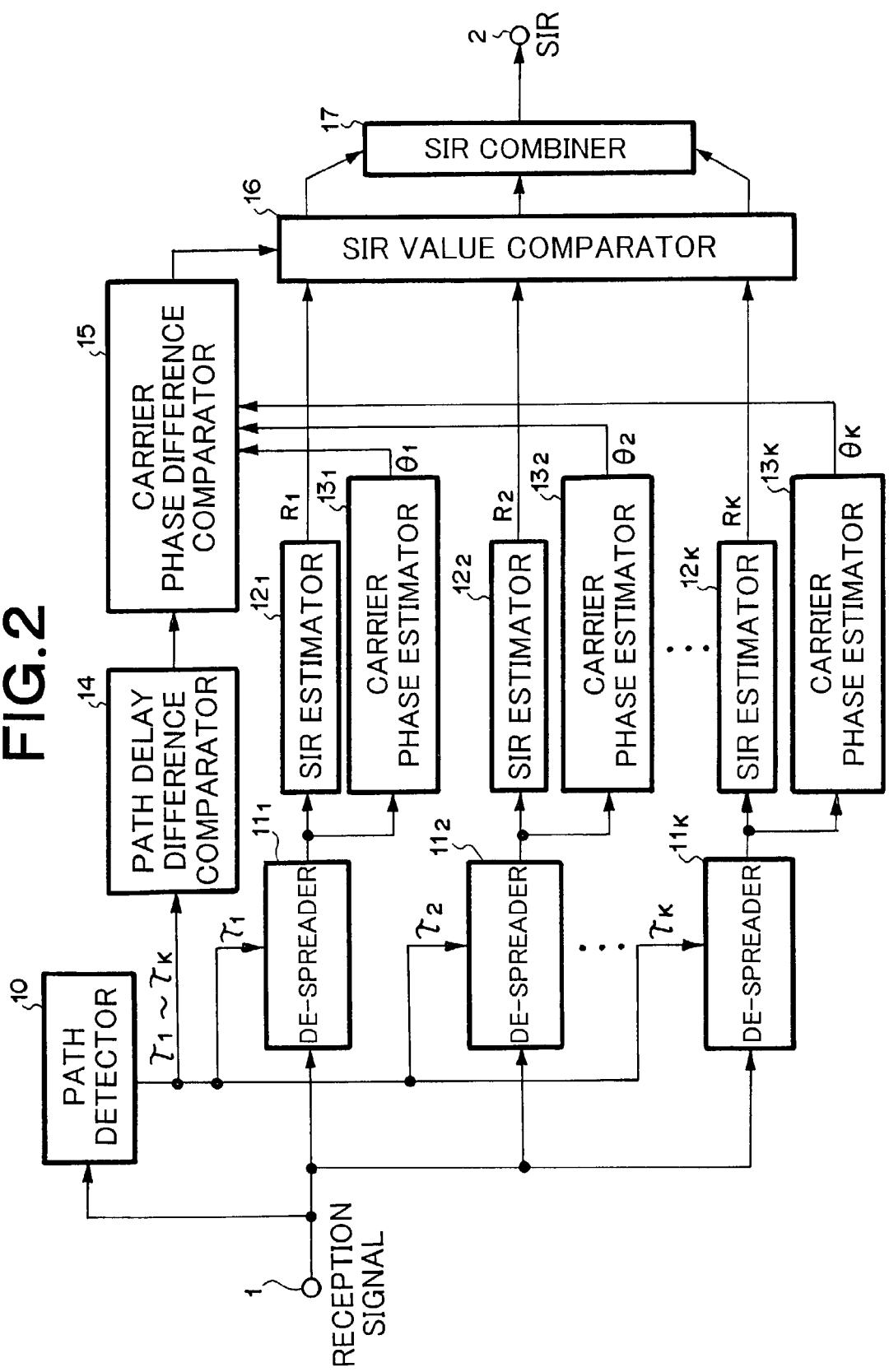
FIG. 2 is a diagram showing the construction of an embodiment of the present invention.

FIG. 2 is a diagram showing the construction of an embodiment according to the present invention. Referring to FIG. 2, an SIR measuring apparatus according to this embodiment includes path detector 10, de-spreaders $11_1$ to $11_K$ (K represents two or more positive integer), SIR estimators $12_1$ to $12_K$ and carrier phase estimators $13_1$ to $13_K$ which are provided in connection with the respective de-spreaders $11_1$ to $11_K$, path delay difference comparator 14, carrier phase difference comparator 15, SIR value comparator 16 and SIR combiner 17.

First, the connection relationship (signal input/output) of the respective parts and the functions thereof will be described.

Reception signal 1 is inputted to the path detector 10, and path delay amounts $\tau_1$ to $T_K$ detected are shared to the de-spreaders $11_1$ to $11_K$ and also inputted to the path delay difference comparator 14.

The outputs of the de-spreaders $11_1$ to $11_K$ are inputted to the respective SIR estimators $12_1$ to $12_K$ and the corresponding carrier phase estimators $13_1$ to $13_K$. The outputs of the SIR estimators $12_1$ to $12_k$ are inputted to the SIR value comparator 16. The outputs of the carrier phase estimators $13_1$ to $13_K$ are inputted to the carrier phase difference comparator 15, and the output of the path delay difference comparator 14 is also inputted to the carrier phase difference comparator 15.

The output of the carrier phase difference comparator 15 is inputted to the SIR value comparator 16. The output of the SIR value comparator 16 is inputted to the SIR combiner 17, and the output of the SIR combiner 17 is outputted as an SIR value to a transmission power controller.

The path detector 10 detects the path delay amounts $\tau_1$ to $\tau_K$ of the reception signal 1. The de-spreaders $11_1$ to $11_K$ de-spread the reception signal 1 according to the path delay amounts indicated by the path detector 10, respectively. That is, the correlation between the reception signal and each of the spreading codes achieved by delaying the spreading code of a spreading code generator on the basis of the path delay amounts is determined and outputted.

The SIR estimators $12_1$ to $12_K$ estimate the corresponding SIR values $R_1$ to $R_K$ every path. In the carrier phase estimators $13_1$ to $13_K$, the carrier phases $\theta_1$ to $\theta_K$ are estimated every path.

The path delay difference comparator 14 detects respective pairs of paths satisfying the condition that the difference between any two delay amounts selected from path delay amounts ($\tau_1$ to $\tau_K$) detected by the path detector 10 is not more than a predetermined threshold value $\tau_{th}$. That is, the path delay difference comparator 14 detects, from the paths inputted thereto, respective pairs of paths (i,j) (i and j represent positive integer and are not equal) satisfying the condition that the delay difference $|\tau_i - \tau_j|$ between the paired paths is not more than a predetermined threshold value $\tau_{th}$.

$$|\tau_i - \tau_j| \leq \tau_{th} \quad (2)$$

The carrier phase difference comparator 15 receives each path pair outputted from the path delay difference comparator 14, compares the two carrier phases corresponding to the path pair and outputs each pair of paths satisfying the condition that the difference in the carrier phase is not more than a predetermined threshold value $\theta_{th}$. That is, the carrier phase difference comparator 15 receives the path pairs (i,j) outputted from the path delay difference comparator 14, compares the carrier phases $\theta_i$, $\theta_j$ of the path pairs (i,j) and outputs pairs (combinations) of paths (i', j') (i' and j' represent positive integer and are not equal) which satisfy the condition that the phase difference between the paths is not more than the threshold value $\theta_{th}$.

$$|\theta_i' - \theta_j'| \leq \theta_{th} \quad (3)$$

The SIR comparator 16 receives the SIR values outputted from the plural SIR estimators $12_1$ to $12_K$ and also receives the path pair outputted from the carrier phase difference comparator 15, and then, the SIR comparator 16 regards as the same path the paths of each pair satisfying the condition that the carrier phase difference between the paired paths is not more than a predetermined threshold value, compares the SIR values of the paths of the pair and outputs the larger SIR value. With respect to the paths other than the path pair outputted from the carrier phase difference comparator 15, SIR outputted from the SIR estimator is directly outputted.

That is, the SIR value comparator 16 receives the path pairs (i', j') outputted from the carrier phase difference comparator 15, and compares the SIR values $R_i'$, $R_j'$ corresponding to (i', j') to output only the larger SIR value. For example, when the SIR value $R_i'$ is larger than the SIR value $R_j'$, the SIR value $R_i'$ is outputted to the SIR combiner 17, and the SIR value $R_j'$ is not outputted to the SIR combiner 17.

Further, with respect to the paths other than the path pairs (i', j') outputted from the carrier phase difference comparator 15, the SIR value comparator 16 directly outputs the SIR value outputted from the SIR estimator 12 to the SIR combiner 17.

In the SIR combiner 17, the total of the SIR values outputted from the SIR value comparator 16 is calculated, and outputted as the SIR output 2.

As described above, according to the embodiment of the present invention, if there exists any pair of paths satisfying the condition that the difference in path delay amount is not more than the predetermined threshold value $\tau_{th}$ and also the difference in carrier phase is not more than the predetermined threshold value $\theta_{th}$, with respect to the SIR values of each path pair (i', j') outputted from the carrier phase difference comparator 15, the SIR value comparator 16 outputs only one larger SIR value. Therefore, the SIR value of the same path is prevented from being added twice (in this case, the total number of the SIR values outputted from the SIR value comparator 16 is smaller than K).

The operation of the embodiment according to the present invention will be described.

The reception signal 1 is inputted to the path detector 10, and the path delay amounts $\tau_1$ to $\tau_K$ detected are shared to the de-spreaders $11_1$ to $11_K$ and also simultaneously inputted to the path delay difference comparator 14. In each of the de-spreaders $11_1$ to $11_K$, the input signal is de-spread according to an indicated path delay amount, and then inputted to the SIR estimators $12_1$ to $12_K$ and the carrier phase estimators $13_1$ to $13_K$. In the SIR estimators $12_1$ to $12_K$, the SIR value is estimated every path and then outputted to the SIR value comparator 16.

In the carrier phase estimators $13_1$ to $13_K$, the carrier phases $\theta_1$ to $\theta_K$ are estimated every path and then outputted to the carrier phase difference comparator 15.

In the path delay difference comparator 14, respective pairs of paths (i,j) satisfying the condition that the difference in path delay amount between the paired paths is not more than a predetermined threshold value $\tau_{th}$ are detected and selected from the paths inputted to the path delay difference comparator 14, and then outputted to the carrier phase difference comparator 15.

In the carrier phase difference comparator 15, with respect to the respective pairs of paths inputted from the path delay difference comparator 14, the carrier phases $\theta_i$, $\theta_j$ of the path pairs are compared with each other, and pairs (combinations) of paths (i', j') which satisfy the condition that the phase difference between the paths is not more than the threshold value $\theta_{th}$ is outputted to the SIR value comparator 16.

In the SIR value comparator 16, with respect to the respective pairs of paths inputted from the carrier phase difference comparator 15, the SIR values $R_i$, $R_j$ of the paired paths are compared with each other, and only one larger SIR value is outputted to the SIR combiner 17. For example, with respect to the paths 1 to 6, in the case where a pair of paths satisfying the condition that the difference in path delay amount is not more than the threshold value $\tau_{th}$ and also the difference in carrier phase difference is not more than the threshold value $\theta_{th}$ is a pas pair (2,3), if the SIR values satisfy $R_3 > R_2$, the SIR value comparator 16 outputs the SIR value $R_3$ outputted from the SIR estimator $12_3$ to the SIR combiner 17, however, it does not output the SIR value $R_2$ outputted from the SIR estimator $12_2$ to the SIR combiner 17. In the SIR combiner 17, the SIR values inputted from the SIR value comparator 16 as described above are added with one another and outputs the total thereof.

Figure 3:
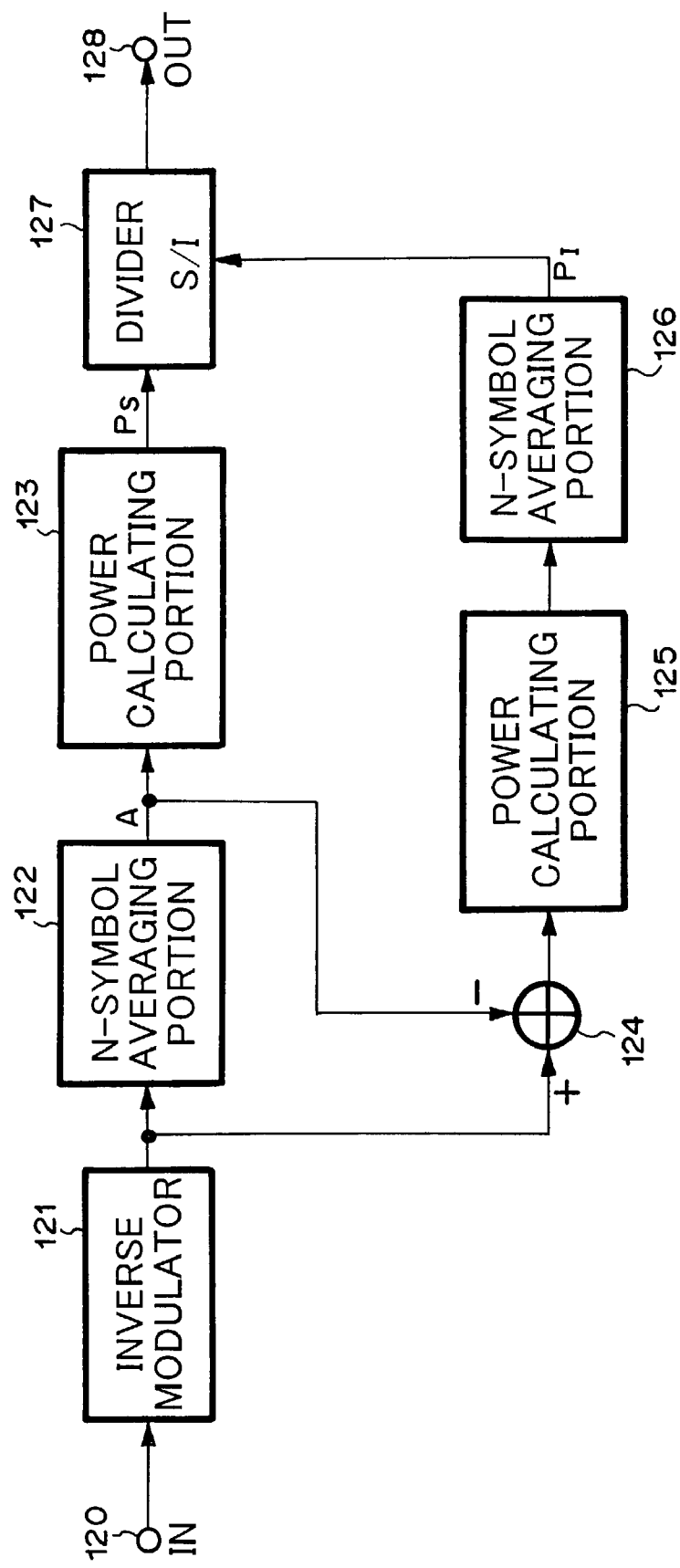
FIG. 3 is a diagram showing an example of the construction of an SIR estimator according to the embodiment of the present invention.

FIG. 3 is a diagram showing an example of the construction of the SIR estimators $12_1$ to $12_K$. The SIR estimators $12_1$ to $12_K$ have the same construction, and only one SIR estimator will be representatively described.

It is assumed that input signal 120 contains a known pilot signal, and frame synchronization based on unique word or the like is established by another synchronizing circuit.

Referring to FIG. 3, the SIR estimator includes inverse modulating portion 121, N-symbols averaging portions 122 and 126, power calculating portions 123 and 125, adder (subtracter) 124, and divider 127. The pilot signal part (portion) of the input signal 120 is subjected to inverse modulation in the inverse modulating portion 121 to achieve a non-modulated signal. The inversely-modulated pilot signal is averaged in the section of the N (N represents a predetermined positive integer) symbols in the N symbol averaging portion 122 to calculate the vector average A of the signal (see the following equation (4)).

$$A = P + jQ = (1/N)\sum_{i=1}^{N}(Pi + jQi) \quad (4)$$

$$P = (1/N)\sum_{i=1}^{N} Pi$$

$$Q = (1/N)\sum_{i=1}^{N} Qi$$

($j^2=-1$, P and Q represents in-phase and orthogonal components)

In the power calculating portion 123, the sum of the square of an imaginary part (orthogonal component) and the square of a real part (in-phase component) of the vector average A is calculated to achieve the average power $P_s$ of the signal component (see the following equation (5)).

$$Ps = \left\{(1/N)\left(\sum_{i=1}^{N} Pi\right)\right\}^2 + \left\{(1/N)\left(\sum_{i=1}^{N} Qi\right)\right\}^2 \quad (5)$$

The difference ($\Delta i$) between the output signal of the inverse modulating portion 121 and the vector average A is calculated in the adder (functioning as the subtracter) 124 (see the following equation (6)).

$$\Delta i = (Pi + jQi) - (P + jQ) \quad (6)$$

In the power calculating portion 125, the power (Pi) is calculated from the square of the amplitude of the difference $\Delta i$ as the subtraction result in the adder 124 (see the following equation (7)).

$$Pi = (Pi - P)^2 + (Qi - Q)^2 \quad (7)$$

This power is averaged in the N-symbol averaging portion 126, and the average power (corresponding to the dispersion) of the difference between the input signal and the vector average A is calculated (see the following equation (8)).

$$P_I = (1/N)\sum_{i=1}^{N}\{(Pi - P)^2 + (Qi - Q)^2\} \quad (8)$$

In the divider 127, the ratio of $P_S$ and $P_I$ is calculated to determine SIR, and it is outputted as the output signal 128.

$$SIR = P_s/P_I \quad (9)$$

Figure 4:
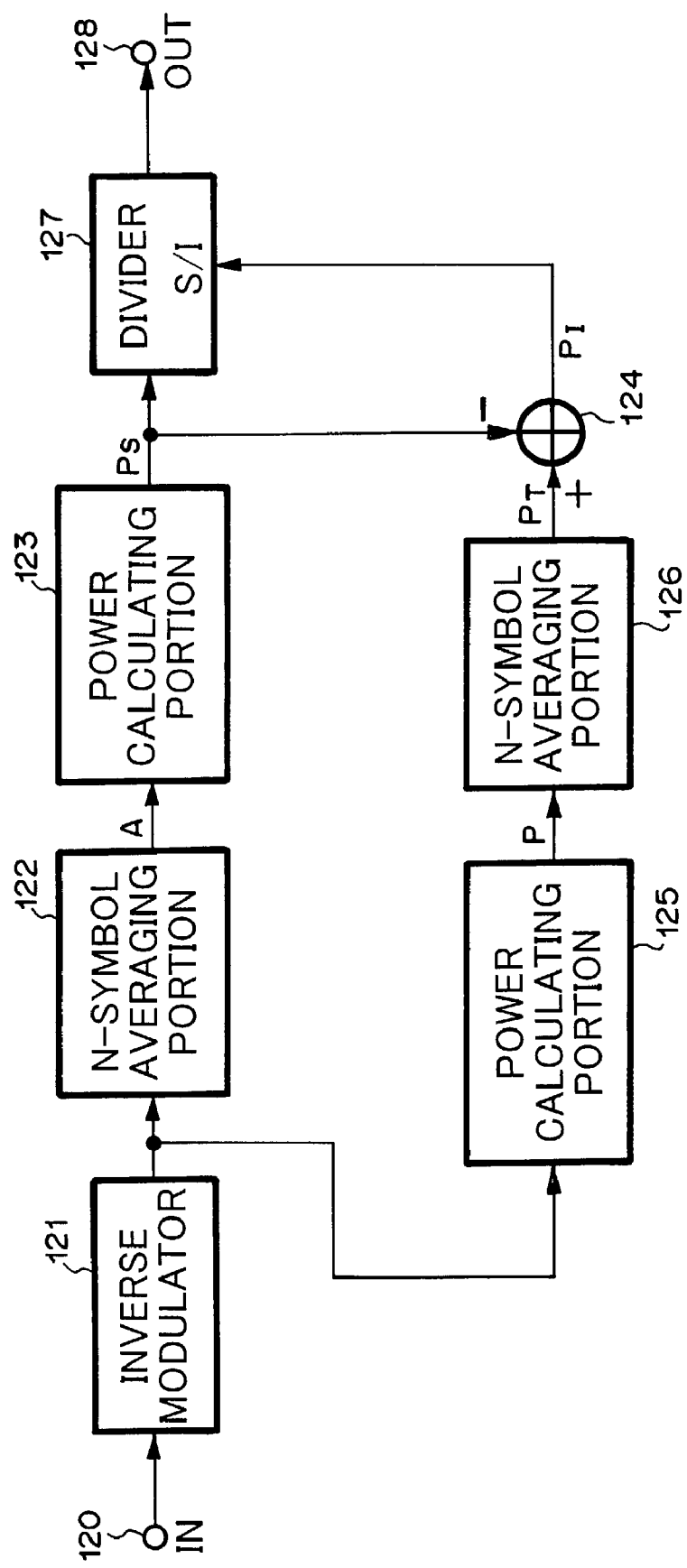
FIG. 4 is a diagram showing another example of the construction of the SIR estimator according to the embodiment of the present invention.

FIG. 4 is a diagram showing another example of the construction of the SIR estimator 12 of FIG. 2.

In this case, it is also assumed that the input signal 120 contains a known pilot signal, and frame synchronization based on unique word or the like is established by another synchronizing circuit. The average power $P_S$ of the signal achieved by the N-symbol averaging portion 122 and the power calculating portion 123 is the same as shown in FIG. 3.

The power is first determined for the input signal in the power calculating portion 125, the power is averaged over N symbols in the N-symbol averaging portion 126 to calculate the average power $P_T$, and $P_T$ is subtracted from $P_S$ in an adder (functioning as a subtracter) 124 to achieve the average power $P_I$ of the interference component.

Figure 5:
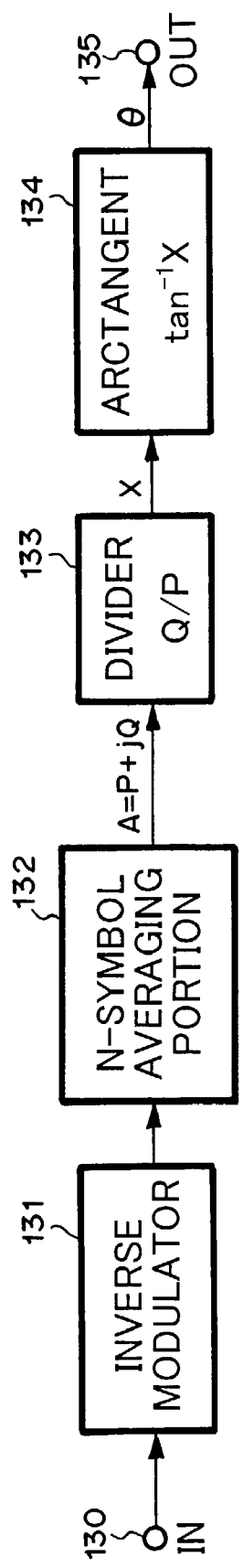
FIG. 5 is a diagram showing an example of the construction of a carrier phase estimator according to the embodiment of the present invention.

FIG. 5 is a diagram showing an example of the construction of the carrier phase estimators $13_1$ to $13_K$ of FIG. 2.

The carrier phase estimators $13_1$ to $13_K$ have the same construction, and thus only one carrier phase estimator will be representatively described.

Referring to FIG. 5, the carrier phase estimator includes inverse modulating portion 131, N-symbol averaging portion 132, divider 133 and inverse tangent portion 134. The input signal 130 contains a known pilot signal, and the frame synchronization based on unique word or the like is established by another synchronizing circuit. The pilot signal contained in the input signal is subjected to the inverse modulation in the inverse modulating portion 131 to achieve a non-modulated signal. The signal thus achieved is averaged over N symbols in the N-symbol averaging portion 132 to achieve the vector average of the signal A=P+jQ.

In the divider 133, Q/P is calculated, and $\tan^{-1}$ (arctangent function value) of Q/P is calculated in an arctangent portion 134 to determine the carrier phase $\theta$ ($\theta = \tan^{-1}(Q/P)$).

The processing of the SIR estimator 12 and the carrier phase estimator 13 is implemented by DSP (Digital Signal Processor) or the like, for example. The SIR measuring apparatus and method according to the present invention can perform SIR measurement with high precision, and the SIR measuring apparatus is suitably mounted in a mobile terminal and/or a base station of a mobile communication system of CDMA system.

FIG. 6 is a diagram showing a part of the construction of a mobile terminal or a base station of a mobile communication system of CDMA system. The part refers to SIR measuring apparatus and related portions.

The basic construction of a base station is same as that of a mobile terminal in CDMA system.

A reception signal is inputted to CDMA demodulator 21 and SIR measuring apparatus 22. The reception signal is subjected to processing as de-spreading, demodulating and decoding in the CDMA demodulator 21, and reception data are outputted from the CDMA demodulator 21. SIR measuring apparatus 22 measures SIR from the inputted reception signal and outputs the SIR to target SIR comparator 23. The target SIR comparator 23 compares the SIR with target SIR and the compared result is outputted to power control signal generator 24, and then a power control signal for controlling the power of transmission side is generated in the power control signal generator 24. The generated power control signal is multiplexed with transmission data in power control signal multiplexer 25 and then spread in CDMA spreader 26. The CDMA signal (transmission signal) is transmitted to the transmission side.

What is claimed is:

1. An SIR measuring apparatus for an CDMA communication system, comprising:
   a path detector for detecting path delay amounts of a reception signal inputted;
   plural de-spreaders for de-spreading the reception signal inputted on the basis of the path delay amounts detected by said path detector;
   plural SIR estimators which are provided in connection with said plural de-spreaders and estimate SIR (Signal to Interference Ratio) values for every path;
   plural carrier phase estimators which are provided in connection with said plural de-spreaders and estimate carrier phase for every path;
   a path delay difference comparator for detecting, from the paths detected by said path detector, each pair of paths satisfying the condition that the difference in the path delay amounts between the paired paths is not more than a first threshold value;
   a carrier phase difference comparator for receiving the output from said carrier phase estimators, for receiving the path pairs outputted from said path delay difference comparator, comparing the carrier phase between the paths of each of the path pairs, and outputting each pair of paths satisfying the condition that the difference in carrier phases between the paired paths is not more than a second threshold value;
   an SIR comparator for receiving the SIR values outputted from said plural SIR estimators and the path pairs outputted from said carrier phase difference comparator, comparing the SIR values between the paths of each of the path pairs, outputting only the larger SIR value, and directly outputting the SIR values outputted from said SIR estimators with respect to paths other than the paired paths output from said carrier phase difference comparator; and
   an SIR combiner for summing the SIR values outputted from said SIR value comparator and outputting the total value.

2. The SIR measuring apparatus as claimed in claim 1, wherein said SIR estimator includes:
   an inverse modulating portion for inversely modulating a pilot signal part of the signal inputted to said SIR estimator and outputting a non-modulated signal;
   a first symbol averaging portion for averaging the signal outputted from said inverse modulating portion over predetermined N symbols to calculate the average (A) of the signal;
   a first power calculating portion for calculating the square of the amplitude of the average outputted from said first symbol averaging portion and outputting the average power (Ps) of the signal component;
   a subtracter for calculating the vector difference between the signal outputted from said inverse modulating portion and the average (A);
   a second power calculating portion for calculating the power from the square of the amplitude of the output of said subtracter;
   a second symbol averaging portion for averaging the power outputted from said second power calculating portion over N symbols and calculating the average power (PI) of the difference between the signal outputted from said inverse modulating portion and the average (A); and
   a divider for receiving the output (Ps) of said first power calculating portion and the output (PI) of said second symbol averaging portion and calculating SIR from the ratio of the output (Ps) and the output (PI).

3. The SIR measuring apparatus as claimed in claim 1, wherein said SIR estimator comprises:
   an inverse modulating portion for inversely modulating a pilot signal part of the signal inputted to said SIR estimator and outputting a non-modulated signal;
   a first symbol averaging portion for averaging the signal outputted from said inverse modulating portion over predetermined N symbols to calculate the average (A) of the signal;
   a first power calculating portion for calculating the square of the amplitude of the average outputted from said first symbol averaging portion and outputting the average power (Ps) of the signal component;
   a second power calculating portion for calculating the power (P) from the square of the amplitude for the signal outputted from said inverse modulating portion;
   a second symbol averaging portion for averaging the power outputted from said second power calculating portion over N symbols to calculate average power (PT);
   a subtracter for subtracting the output (PT) of said second symbol averaging portion from the output (PS) of said first power calculating portion to achieve average power (PI) of an interference component; and
   a divider for receiving the output (PS) of said first power calculating portion and the output (PI) of said subtracter and calculating SIR from the ratio of the output (PS) and the output (PI).

4. The SIR measuring apparatus as claimed in claim 1, wherein said carrier phase estimator comprises:
   an inverse modulating portion for inversely modulating a pilot signal part of the input signal and outputting a non-modulated signal;
   a symbol averaging portion for averaging the pilot signal outputted from said inverse modulating portion over a predetermined number of symbols to calculate the vector average of the signal; and
   means for determining the phase from the real number and imaginary number of the output of said symbol averaging portion by using an arctangent function.

5. A base station having the SIR measuring apparatus as claimed in claim 1, said base station being comprised in the CDMA communication system.

6. A mobile terminal having the SIR measuring apparatus as claimed in claim 1, said mobile terminal being comprised in the CDMA communication system.

7. An SIR measuring method for an CDMA communication system, comprising:
   a step of detecting path delay amounts from a reception signal;
   a step of extracting each pair of paths satisfying the condition that the difference in the path delay amounts is not more than a first threshold value;
   a step of de-spreading the reception signal on the basis of the path delay amounts;
   a step of estimating an SIR (Signal to Interference Ratio) value for every path on the basis of the de-spread signal;
   a step of estimating carrier phase for every path on the basis of the de-spread signal;
   a step of comparing the carrier phase between each pair of paths satisfying the condition that the difference in the path delay amounts is not more than the first threshold value, and based on said extracted path pairs and said estimated carrier phase for each path, extracting, pairs of paths satisfying that the difference in carrier phases is not more than a second threshold value; and a step of regarding as the same path the paths of each pair satisfying that the difference in the path delay amounts is not more than the first threshold value and the difference in carrier phases is not more than the second threshold value, selecting a larger SIR value from the SIR values of the paths of each pair and using the larger SIR values thus selected for calculation of SIR combining.

* * * * *